(12) United States Patent
Skinner

(10) Patent No.: X3050
(45) Date of Patent: Dec. 28, 1818

(54) PAINT MILL

(76) Inventor: Elijah Skinner

Elijah Skinner.
Letters Patent

The schedule referred to in these Letters Patent and making part of the same containing a description in the words of the said Elijah Skinner himself, of his improvement in the mill for grinding paint, &c.

---

First, I make a conical grinder, either of wood and covered with cast iron, or any other suitable metal with flanges or ribs at the smaller end, or the whole may be cast solid of iron, with the flanges cast on. 2d This cone is made to turn inside of a hollow cone, of the same figure with the former, lined with metal, and made to fit nearly to the cone, leaving a proper space for the paint to be worked or ground in. 3d There is a hopper, into which the unground paint is put, that descends through an opening to the revolving cone, and is immediately taken in by the flanges at the smaller end of the conical grinder.

4th The cone or grinder is turned by a crank, or by a strap passing over a wheel on its axle, by animal or any other convenient power. 5th When the cone is turned the paint is ground, first by being broken by the rough flanges, and then passing along to the larger end of the cone, where it is ground fine, and passes out at an opening made for the purpose. If not ground fine enough at once it may be passed through again.

This mode of grinding paint possesses the advantages of grinding the paint very fine, and of not being easily clogged. It will answer equally well for grinding printers ink &c.

Witnesses,
Charles White
Geo: F. Marston

Elijah Skinner

DRAFTSMAN'S DIVISION.

*All communications should be addressed to*
"The Commissioner of Patents,
Washington, D. C."

2—328 a.

*DEPARTMENT OF THE INTERIOR,*

United States Patent Office.

*Washington, D. C.,* ............................, *189*..

*SIR:*

*The printed* ........copies........ *of Patent No.* ....E Skinner....

........are.... *exhausted.* Dec 28, 1818

*As soon as reprinted a copy will be mailed you to complete your order.*

........................................

........................................

*By direction of the Commissioner:*

*Very respectfully,*

........................................

*Chief Clerk.*

........................................

........................................

8143b6-97-5m